(12) United States Patent
Landin et al.

(10) Patent No.: US 6,410,160 B1
(45) Date of Patent: Jun. 25, 2002

(54) POROUS METAL-CONTAINING MATERIALS, METHOD OF MANUFACTURE AND PRODUCTS INCORPORATING OR MADE FROM THE MATERIALS

(75) Inventors: Steven M. Landin, Colden; Dennis W. Readey, Lakewood; Darin J. Aldrich, Westminster, all of CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 09/555,734
(22) PCT Filed: May 4, 1999
(86) PCT No.: PCT/US99/09727
§ 371 (c)(1),
(2), (4) Date: Nov. 24, 1999
(87) PCT Pub. No.: WO99/56899
PCT Pub. Date: Nov. 11, 1999

Related U.S. Application Data

(60) Provisional application No. 60/084,050, filed on May 4, 1998.

(51) Int. Cl.[7] .................................................. B22F 3/10
(52) U.S. Cl. ........................ 428/613; 264/628; 264/662; 264/674
(58) Field of Search ......................... 428/613; 264/628, 264/662, 674

(56) References Cited

U.S. PATENT DOCUMENTS

| | | | |
|---|---|---|---|
| 4,612,600 A | 9/1986 | Hodgkins | 361/321 |
| 5,417,917 A | 5/1995 | Takahar et al. | 419/2 |
| 5,503,122 A | 4/1996 | Ritland et al. | 123/188.3 |
| 5,525,374 A | 6/1996 | Ritland et al. | 427/376.1 |
| 5,735,332 A | 4/1998 | Ritland et al. | 164/98 |

*Primary Examiner*—Daniel J. Jenkins
(74) *Attorney, Agent, or Firm*—Holme Roberts & Owen LLP; Christopher J. Kulish, Esq.

(57) ABSTRACT

Porous metal-containing materials are provided for a variety of uses including filters, electrodes for batteries and fuel cells, light weight structural materials, heat exchangers and catalysts. A method is provided for making the porous metal-containing materials involving vapor phase sintering of a metal oxide green form followed by reduction to form a porous metal-containing material, typically without any significant shrinkage of the sample occurring during processing. The porous metal-containing materials may have porosities of from about 40 percent to as high as 90% in some embodiments. Furthermore, the pore volume is highly interconnected, which is particularly advantageous for many applications.

48 Claims, 12 Drawing Sheets

POROUS METAL-CONTAINING MATERIALS, METHOD OF MANUFACTURE AND PRODUCTS INCORPORATING OR MADE FROM THE MATERIALS

CROSS REFERENCE TO RELATED APPLICATIONS

This application claims priority under 35 U.S.C. §119 to prior U.S. Provisional Patent Application No. 60/084,050, filed May 4, 1998, the entire contents of which are incorporated herein by reference.

FIELD OF THE INVENTION

The present invention involves porous metal-containing materials, a method for making porous metal-containing materials, and products and uses involving the porous metal-containing materials.

BACKGROUND OF THE INVENTION

Porous metal materials present a broad spectrum of possibilities for advanced applications. In the case of metallic foams, applications include filters, battery and fuel cell electrodes, heat exchangers, catalysts and light-weight structural materials. The advantages of porous metal materials generally relate to high porosity, high surface area and light weight. For many applications, it is desirable that the porosity be as high as possible. Another desirable feature, for many applications, is that the pore volume within the porous metal be highly interconnected, or open. This is particularly true for metallic filters, electrode materials, heat exchangers and catalysts.

Metallic foams have been produced by liquid and solid state processing methods. A foaming gas can be used to create the pore volume in metallic foam materials, but the major limitation of that method is that a predominantly closed pore structure often results. Metallic foams can also be produced through the addition of a surrogate pore-former, typically an organic material, that is removed, either thermally or chemically, after fabrication. Also, metallic foams have been fabricated by deposition or infiltration of a metal into open-cell polymer foam substrates. Loose sintering of fine metallic powders has been used to produce structures with densities in the range of 30 to 50%, but control of the resulting microstructure can be very difficult. Porous metals used as filters have been made by partial sintering of compacted metal powders. The porous metals made by partial sintering, however, typically have densities greater than 50% and poor permeability characteristics.

Takahar and Fukuura, in U.S. Pat. No. 5,417,917, describe a method for partially sintering certain particulate metal oxides in air, followed by reduction to a porous metallic form. They report that porosities of over 60% have been obtained with nickel. There are, however, problems with the method described by Takahar and Fukuura.

A significant problem is that the method is reported to involve a high level of shrinkage during processing. Therefore, to obtain relatively high porosities in the final porous metal structure, significant amounts of organic material are mixed with the starting metal oxide powders and the powders are only lightly compacted prior to sintering. Under these conditions, it is doubtful that extensive joining of grains will develop during the sintering step, with a result being that the porous metal structure following reduction may not have a high structural strength, severely limiting the potential applications for the material. Moreover, a low structural strength could render the material susceptible to particle shedding, which would be particularly undesirable for filter applications.

Furthermore, the high level of shrinkage reported by Takahar and Fukuura significantly limits the ultimate porosity that may be achieved in the final product, even with the addition of organic material and with only light compaction of starting powders. Furthermore, addition of organic material can result in residual organics remaining in the final product, which could contribute to detrimental outgassing if the material were used in high performance air filter applications, such as filtering air for "clean rooms" required for certain semiconductor fabrication and pharmaceutical manufacture operations. Moreover, a high level of shrinkage may actually result in the closing of some of the pore space during processing, reducing the permeability of the material.

There is a need for improved porous metallic materials and methods for manufacturing such materials.

SUMMARY OF THE INVENTION

With the present invention, it has been found that porous metallic materials can be made by sintering a green form metal oxide followed by chemical reduction to a metallic form and with only a low, or negligible, level of shrinkage during processing, provided that the sintering step is conducted under conditions to promote vapor phase sintering. It has also been found that such porous metallic materials may thus be made to include very high porosities and a desirable open pore structure with a small mean pore size.

In one aspect, the present invention provides a porous metal-containing material having highly interconnected, open pore volume. Depending upon the specific material and the characteristics of the final porous metallic product, especially the pore size, the porous metallic material may have a porosity of 40 volume percent or larger. The porosity for most applications, however, will typically be larger than about 60 volume percent and more typically larger than about 65 volume percent. In a preferred embodiment, the porosity is larger than about 70 volume percent.

Nonlimiting examples of some metals that may be included in the porous metallic materials include iron (Fe), nickel (Ni), copper (Cu), vanadium (V), cobalt (Co), zinc (Zn), cadmium (Cd), tin (Sn), tungsten (W), chromium (Cr), niobium (Nb) and molybdenum (Mo). The porous metal-containing material may include substantially only a single metal, or may include more than one metal.

The porous metal-containing material may be made with any convenient pore size, which is typically smaller than about 100 microns. For many applications, however, the pore size will be smaller than about 10 microns, smaller than about 5 microns, smaller than about 2 microns, or even smaller than about 1 micron for some applications.

The pore volume of the porous metal-containing material is highly interconnected, so that most, and preferably substantially all, of the pore volume is open. There is very little, and preferably substantially no, closed pore volume. Because of the highly interconnected nature of the pore volume in the porous metal-containing materials, the materials typically exhibit a very high permeability to fluids. The high permeability of the porous metal-containing materials is particularly desirable for applications involving fluid flow, such as filtration and heat exchange.

In a major aspect, the present invention provides a method for manufacturing porous metal-containing materials. The manufacture method is particularly advantageous for making extremely high quality metal-containing materials with a high content of open pore volume. The manufacture method typically involves vapor phase sintering of a green form of metal oxide feed to form a porous sintered metal oxide material. Prior to the vapor phase sintering, the metal oxide is typically in a fine particulate form that has been compressed or otherwise preformed into the desired green form. After the vapor phase sintering, at least a portion of the precursor metal oxide is then reduced to metallic form to prepare the porous metal-containing material. It should be noted that the sintered metal oxide and the method of making the sintered metal oxide are within the scope of the present invention, as is the reduction of the sintered metal oxide to form the porous metal-containing material.

A particularly surprising and advantageous aspect of the manufacture method is that the method may be performed with very little, if any, shrinkage occurring between the metal oxide green form and the final porous metal-containing material. Not to be bound by theory, but to aid in the understanding of the invention, this low level of shrinkage is believed to be at least partially due to manufacture of the sintered metal oxide by vapor phase sintering. Typically, the shrinkage occurring between the metal oxide green form and the porous metal-containing material will be smaller than about 15 volume percent, preferably smaller than about 10 volume percent, and most preferably smaller than about 5 volume percent. In many instances, shrinkage may be smaller than about 2 volume percent. Furthermore, the low shrinkage values noted apply to each of the steps of vapor phase sintering (metal oxide green form vs. sintered metal oxide) and reduction (sintered metal oxide vs. porous metal-containing material), as well as to the overall process (metal oxide green form vs. porous metal-containing material). As will be appreciated, when reference is made herein to shrinkage, the reference is relative to the bulk volume of the relevant material, which includes pore volume.

Furthermore, high porosities in the porous metal-containing material may be achieved typically without the use of organics. Organics may, however, be used if desired. For example, to make materials of extremely high porosity, such as larger than about 80 volume percent, a polymer may be mixed with the metal oxide powder to serve as a surrogate pore former. Subsequent removal of the polymer will result in a higher pore volume. In this way, porosities of even larger than about 90 percent may be possible. When polymers are added, they are preferably in the form of small spheres, which may be of any convenient size. Typical sizes are from about 1 micron, or smaller, to about 200 microns, although the smaller sizes are preferred for most applications. The polymer is typically removed by thermal decomposition/volatilization or dissolution in a solvent prior to the vapor phase sintering step.

When the porous metal-containing material includes multiple metals, the metal oxide green form could include a mixture of different metal oxide powders. Preferably, however, the metals would be present in the form of a single powder of a complex metal oxide.

The vapor phase sintering of the metal oxide feed occurs at conditions under which at least one volatile metal-containing component is present at a significant vapor pressure. This is often accomplished through inclusion of at least one reactive gas component in the atmosphere during sintering. The reactive gas component reacts with the metal oxide to form one or more volatile metal-containing components which are responsible for significant mass transport in the vapor phase during the sintering operation. Although other transport mechanisms may also contribute to mass transport, the vapor phase transport should be the dominant mechanism, so that vapor phase transport is the controlling mechanism for mass transport. The reactive gas component may be any component that exists in the vapor phase at the conditions of the vapor phase sintering. Preferred reactive gas components are HCl and other halide gases, although other reactive gas components, as are now or hereafter known in the art for vapor phase sintering, could be used instead.

The temperature at which the vapor phase sintering is conducted will depend upon the specific metal oxide feed and the desired properties in the final porous metal-containing material. In most instances, however, the temperature will be in a range of from about 500° C. to about 1700° C. For a given material, the use of a higher temperature will typically result in a larger mean pore size and a lower temperature will result in a smaller mean pore size in the porous metal-containing material. Also, the size and uniformity of the pores may be controlled to some degree by the particulate characteristics of metal oxide feed. The use of smaller starting metal oxide particles tends to result in smaller pores in the porous metal-containing material. The use of more uniformly sized metal oxide particles tends to result in more uniform pore sizes in the porous metal-containing material.

As noted, the vapor phase sintering is often conducted in an atmosphere including one or more reactive gas components. The atmosphere during vapor phase sintering may also include, if desired, an inert constituent, such as argon. For many application, the atmosphere in which the vapor phase sintering takes place should be neither substantially oxidizing nor substantially reducing in character. Rather, it is often preferred that the atmosphere promote primarily only reactions with the metal oxide feed that contribute to vapor phase mass transport during the vapor phase sintering.

The reduction of the precursor, following the vapor phase sintering, is conducted in any suitable reducing environment. For example, the reducing atmosphere may include a reducing gas, such as hydrogen gas. The hydrogen gas may be mixed with an inert gas, such as nitrogen. As another example, the reduction may be conducted in a vacuum, either with or without the presence of a reducing gas. The temperature during the reduction may be any convenient temperature, but will typically be lower than the temperature during the vapor phase sintering.

The present invention also includes uses for the porous metal-containing materials and products incorporating or made, at least in part, by further processing of the metal-containing material. For example, the porous metal-containing material may be used as filter elements, electrode materials in electrochemical cells, heat exchange elements, catalysts, combustion substrates and light-weight structural members.

DETAILED DESCRIPTION OF THE INVENTION

With the present invention, it has been found that vapor phase sintering of a metal oxide followed by chemical reduction to metallic form of at least a portion of the sintered metal oxide can advantageously be used to prepare a variety of porous metal-containing materials that have a high porosity and with an open, interconnected pore volume. These characteristics are desirable for a variety of product forms and applications.

In one aspect, the present intervention involves a method for making a metal-containing material in which at least a portion of a porous sintered metal oxide is reduced to metallic form, wherein the porous sintered metal oxide is a porous vapor phase sintered metal oxide. A porous vapor phase sintered metal oxide is a porous sintered metal oxide prepared by vapor phase sintering of a metal oxide feed. The vapor phase sintering is a sintering operation in which transport of material in the vapor phase dominates over transport by other mechanisms, such is by solid-state diffusion processes. By metallic form it is meant that the metal is in an elemental state, including situations when a metallic phase includes only a single elemental metal and also including situations when a metallic phase includes two or more different elemental metals, such as would be the case for an alloy between two or more metals.

Figure 1:
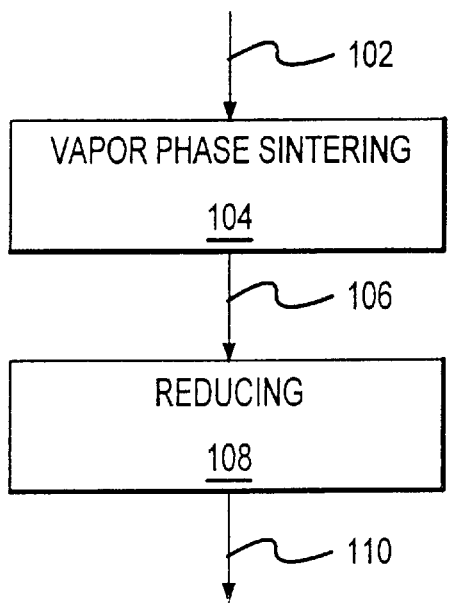
FIG. 1 is a process block diagram showing one embodiment for the method of the present invention for making a porous metal-containing material.

Referring now to FIG. 1, a process block diagram is shown for one embodiment of the method of the present invention. As shown in FIG. 1, a green form 102, including at least one metal oxide, is subjected to a vapor phase sintering step 104 to prepare a porous sintered metal oxide 106. The sintered metal oxide 106 is then subjected to a reducing step 108, to reduce at least a portion of the sintered metal oxide 106 to metallic form and to produce a metal-containing material 110.

The green form 102 may be any convenient form that includes at least one suitable metal oxide for processing. Typically, the green form 102 will comprise at least one metal oxide powder pressed or otherwise formed into a desired shape and consistency for processing. For example, the green form 102 may be prepared by dry pressing a metal oxide powder into a mold with sufficient pressure that the green form 102 has sufficient structural integrity to maintain the shape of the mold after being removed from the mold. Preferred dry pressing pressures are larger than about 25 MPa. Typical dry pressing pressures are in a range of from about 30 MPa to about 150 MPa, although any desired molding pressure can be used. Possible techniques for preparing the green form 102 other than dry pressing include tape casting (for production of metallic foam ribbon extrusion), slip casting, isostatic pressing, roll compaction and green machining. In a typical situation, the green form may have a porosity of from about 40 volume percent to about 50 volume percent.

Furthermore, metal oxide powder(s) used to prepare the green form 102 may have any desired particle size and particle size distribution characteristics. For many applications, when small pores are desired in the metal-containing material 110, the metal oxide powders used to prepare the green form 102 will advantageously have a weight average particle size of smaller than about one micron, and more advantageously will have a weight average particle size in a range of from about 0.1 micron to about one micron. Also, achieving a very uniform fill density of powders in the green form 102 will result in more uniform pore sizes in the metal-containing material 110. Additionally, a more uniform starting powder particle size will contribute to a similar result. A monodisperse oxide powder, such as may be made through controlled hydrolysis of solutions of the metal alkoxides, may be advantageous for some applications. Also, by using a powder having a high packing density, such as a powder with bimodal size distribution, the porous metal-containing material may be made with a very small mean pore size.

Furthermore, the green form 102 may comprise only a single metal oxide, which may be an oxide of only one metal or may be a complex metal oxide of two or more metals, or alternatively may comprise a mixture of two or more different metal oxides. Multiple metal oxides may be provided in the green form 102 by mixing together powders of the different metal oxides. In any event, the green form 102 will include at least one metal oxide that is susceptible to reduction during the reducing step 108. Nonlimiting examples of metal oxides susceptible to reduction during the reducing step 108 include oxides of iron, nickel, copper, vanadium, cobalt, zinc, cadmium, tin, tungsten, chromium, niobium, molybdenum and complex metal oxides including any combination of the foregoing. In addition to at least one metal oxide susceptible to reduction during the reducing step 108, the green form 102 may optionally include one or more other constituent. For example, the green form 102 may include one or more metal oxide not susceptible to reduction during the reducing step 108, in which case the metal-containing material 110 will be a composite material including a nonmetallic phase of the metal oxide not reduced during the reducing step 108. Nonlimiting examples of possible metal oxides not susceptible to reduction during the reducing step 108 include silica ($SiO_2$), alumina ($Al_2O_3$), titania ($TiO_2$), magnesia (MgO), zirconia ($ZrO_2$), yttria ($Y_2O_3$), and ceria ($CeO_2$). Moreover, the green form 102 may include one or more constituents other than a metal oxide. For example, the green form 102 may include organic binder material to help maintain structural integrity of the green form 102 for processing and/or organic filler material to act as a surrogate pore former to increase porosity within the green form 102. These organic materials are typically polymeric. Examples of organic materials that may be included in the green form 102 organic binders, such as poly(vinyl alcohol), butyral resin, and acrylic resin, and organic filler materials, such as polymethyl methacrylate, polytetrafluoroethylene, polystyrene and polyolefins (including polyethylene and polypropylene). When an organic material is included in the green form 102, the organic material is typically removed by either thermal decomposition/volatilization or dissolution into a solvent prior to the vapor phase sintering step 104. Furthermore, other constituents could be included in the green form 102 to the extent that the other constituents do not detrimentally interfere with the vapor phase sintering step 104 or the reducing step 108.

The vapor phase sintering step 104 is conducted under conditions at which one or more metal oxide in the green form 102 undergoes some significant degree of vapor phase sintering. To achieve the desired dominance of vapor phase transport during the vapor phase sintering step 104, it is necessary that at least one volatile metal-containing component be present during the vapor phase sintering step 104 at a sufficiently high vapor pressure. Such a volatile metal-containing component should typically be present during the vapor phase sintering step 104 at a vapor pressure of at least about $10^{-4}$ atmosphere, and preferably at a vapor pressure of at least about $10^{-3}$ atmosphere. If the vapor pressure of the metal-containing component is not sufficiently high, the desired vapor phase transport will not dominate over other transport mechanisms.

In many situations, it will be necessary to include at least one reactive gas component in the atmosphere during the vapor phase sintering step 104 to ensure the presence of a volatile metal-containing component of sufficiently high vapor pressure. This will typically be the case, for example, when the green form 102 includes an oxide of one or both of nickel and iron. As used herein, a reactive gas component is any component existing in the vapor phase capable of participating in a reaction during the vapor phase sintering step 104 to form the volatile metal-containing component. Preferred for use as reactive gas components are halide gases, such as for example hydrogen halides and ammonium halides, with fluoride, chloride, bromide and iodide gases being especially preferred. A reactive halide gas can be introduced into the atmosphere during the vapor phase sintering step 104 by direct addition of the halide gas to the atmosphere or by generation of the halide gas during the vapor phase sintering.

With the present invention, vapor phase sintering is used to control both the grain size and the volume fraction of porosity in the final porous metallic material. As noted, the presence of a reactive gas component promotes formation of the metal-containing volatile component, which contributes to vapor phase transport. For example, for nickel oxide in the presence of hydrogen chloride gas:

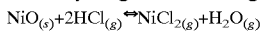

For hematite in the presence of hydrogen chloride gas:

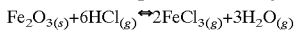

The domination of vapor phase transport as the controlling mechanism for mass transport results in the ability to facilitate grain growth without densification.

When a reactive gas component is included in the atmosphere during the vapor phase sintering step 104, it is frequently desired that the vapor phase sintering step 104 be conducted in an atmosphere that is substantially not oxidizing and substantially not reducing. In that regard, the vapor phase sintering step 104 would typically be conducted substantially in the absence of both hydrogen gas and oxygen gas.

In some instances, it is possible to generate the volatile metal-containing component during the vapor phase sintering step 104 at a sufficiently high vapor pressure without the presence of an added reactive gas component of the type as previously described. This is the case, for example, when the metal oxide being sintered will ordinarily, in the presence of air or an inert atmosphere, generate one or more sufficiently volatile metal-containing component to act as the vapor phase transport vehicle for vapor phase sintering. This would be the case, for example, when sintering an oxide of one or more of tungsten, chromium and molybdenum. As an example, tungstic oxide ($WO_3$) is sufficiently volatile that vapor phase sintering may be conducted in an inert atmosphere, such as in argon, without the addition of a reactive gas component. Also, chromic oxide ($Cr_2O_3$) produces volatile chromium trioxide ($CrO_3$) when heated in air. Even in these situations, however, a reactive gas component could be added to further assist vapor phase transport if desired.

The maximum temperature attained during the vapor phase sintering step 104 may be any convenient temperature that is sufficiently high to cause the desired sintering of the green form 102. When multiple metal oxides are present in the green form 102, the temperature generally will need to be sufficiently high to cause the desired degree of sintering of each of the metal oxides. In most instances, the maximum temperature attained during the vapor phase sintering step 104 will be from about 500° C. to about 1700° C., which will vary depending upon the composition of the green form 102 and the grain and pore characteristics desired in the metal-containing material 110. The duration of the vapor phase sintering step 104 can be any convenient time sufficient to accomplish the desired degree of sintering. For most applications, sintering times in a range of from about 10 minutes to about 10 hours are sufficient, although shorter or longer sintering times may be used, depending upon the specific application.

One problem with current metallic filter technology is the uniformity of the filter microstructure, which can be improved with the present invention. Also, with the present invention a "graded" microstructure may be made, such that the pore size increases through the thickness of the filter. In this way, one surface, with the small pore size, acts as the filtering surface while the other surface acts as a structural "support." A large pore size for the support (compared to the filtering surface) results in higher permeabilities for the effective filtration size. This could be achieved during the vapor phase sintering by sintering the metal oxide structure such that a gradient in temperature is achieved through the thickness of the structure that will result in a graded microstructure in the final porous metal product. For example, applying a temperature gradient of 100° C. across the green form 102 during the vapor phase sintering step 104 could result in significant variation in the pore size across the thickness of the metal-containing material 110. For example, significant differences are shown below in the examples in microstructure and permeability for porous metallic nickel samples vapor phase sintered at 1000° C. and 1200° C.

The sintered metal oxide 106 may include only a single metal oxide or may include two or more different metal oxides, depending upon the composition of the original green form 102. As with the green form 102, the sintered metal oxide 106 must include at least one metal oxide that is susceptible to reduction to metallic form during the reducing step 108, such as one or more of the exemplary metal oxides previously listed. Furthermore, the sintered metal oxide 106 may also include one or more metal oxide that is not susceptible to reduction during the reducing step 108, such as one or more of the exemplary metal oxides previously listed. When the green form 102 does not include organic materials, the sintered metal oxide 106 typically has a porosity that is approximately equal to the original porosity of the green form 102. In many instances, therefore, the sintered metal oxide 106 will have a porosity in a range of from about 40 volume percent to about 50 volume percent. The sintered metal oxide would, of course, tend to have a higher porosity if the green form 102 includes an organic material.

As discussed in greater detail below, the maintenance of a relatively high porosity in the sintered metal oxide results from the low, and often negligible, level of shrinkage occurring during the vapor phase sintering step 104 with the method of the present invention. The low level of shrinkage occurring during the vapor phase sintering step 104 of the present invention represents a significant departure from the high levels of shrinkage reported for prior art processes in which porous metallic materials are prepared by sintering metal oxides followed by reduction to metallic form.

The reducing step 108 is conducted under conditions so that at least a portion of the sintered metal oxide is reduced to metallic form to prepare the porous metal-containing material 110. This is typically accomplished at an elevated temperature and in the presence of a reducing atmosphere. The reducing atmosphere typically includes at least one reducing gas, such as hydrogen gas. Additionally, the reducing atmosphere may also include one or more gases that are inert during the reducing step 108, such as argon gas or nitrogen gas. The temperature during the reducing step 108 should be sufficiently high to accomplish the desired reduction and low enough so that significant sintering is avoided for both of the metal oxide component(s) of the sintered metal oxide 106 and metallic component(s) of the porous metal-containing material 110. The specific time, temperature and reducing atmosphere used during the reducing step 108 will vary depending upon the particular composition of the sintered metal oxide 106 and the particular characteristics desired in the metal-containing material 110. These conditions are determinable by those skilled in the art for processing any specific sintered metal oxide 106 without undue experimentation.

In one embodiment, substantially all of the sintered metal oxide 106 is reduced to metallic form during the reducing step 108, in which case the porous metal-containing material 110 will be substantially entirely metallic. In another embodiment, at least a portion of the sintered metal oxide 106 is not reduced to metallic form during the reduction step, in which case the metal-containing material 110 will be a composite material including at least one metallic phase and at least one nonmetallic phase. Preparation of such a composite material may be accomplished, for example, by including in the green form 102 at least a first metal oxide that is ultimately reduced to metallic form during the reducing step 108 and at least a second metal oxide that is not reduced during the reducing step. As one example, the green form 102 could include nickel oxide, which is reduced to metallic nickel during the reducing step 108, and zirconia, which is not reduced during the reducing step 108, resulting in the metal-containing material 110 being a composite material including a metallic nickel phase and a nonmetallic zirconia phase. Such a composite could be used, for example, to prepare an electrode material for use in solid oxide fuel cells.

As previously noted, the porous metal-containing material 110 must include at least one metallic phase, but may contain a plurality of different metallic phases. Additionally, the metal-containing material 110 may be a composite material including one or more nonmetallic phase. The metal-containing material 110 typically has an interconnected, open pore volume and a high porosity. Typically, the porosity of the metal-containing material 110 is larger than about 40 volume percent, and is more typically larger than about 50 volume percent, and still more typically larger than about 60 volume percent. In preferred compositions, the porosity of the metal-containing material 110 is larger than about 65 volume percent, and more preferably larger than about 70 volume percent. Furthermore, even higher porosities may be obtained when an organic material is included in the green form 102, as previously discussed. By including such organic material, porosities of greater than about 80 volume percent, or even up to about 90 volume percent are possible.

Moreover, the porosity of the metal-containing material 110 is typically significantly larger than the porosity of the sintered metal oxide 106. The increased porosity in the metal-containing material 110 results from additional pore space formation due to elimination of oxygen during the reducing step 108 and to the low, and often negligible, level of shrinkage occurring during the reducing step 108. As previously noted, the low level of shrinkage attainable with the method of present invention provides a significant advantage in the preparation of metal-containing materials having high porosity and an interconnected, open pore volume. As will be appreciated, higher porosities tend to be achievable when the metal-containing material 110 is substantially entirely metallic. When the metal-containing material 110 is a composite material including a nonmetallic phase, porosities tend to be somewhat lower.

The high porosities attainable in the metal-containing material 110 is particularly noteworthy because these high porosities are attained with the present invention even when the mean pore size in the metal-containing material 110 is very small. Typically, the mean pore size in the metal-containing material 110 is smaller than about 10 microns, and more typically smaller than about 5 microns. In a preferred embodiment for many applications, the mean pore size in the metal-containing material 110 is smaller than about 3 microns, more preferably smaller than about 2 microns, and even more preferably smaller than about 1 micron. Even with such a small pore size, however, the metal-containing material 110 is highly permeable, because of the open nature of the pore space. For applications involving the flow of fluids through the metal-containing material 110, it is preferred that the independent permeability of the metal-containing material 110 is larger than about $1\times10^{-11}$ meter, and more preferably larger than about $1\times10^{-10}$ meter.

One particularly noteworthy and surprising aspect of the metal-containing material 110 of the present invention is that, under certain circumstances, it can be made to include porosity within metallic grains of the material matrix. In this situation, the metal-containing material 110 includes primary porosity in interstices between grains and includes secondary porosity within at least a portion of the grains. The mean pore size in the primary porosity is significantly larger, typically an order of magnitude or more larger, than the mean pore size in the secondary porosity. The development of this secondary porosity is advantageous in that it provides for increased porosity of the metal-containing material 110 without significant impairment of structural strength of the metal-containing material 110. This would be particularly desirable for applications where structural strength is an important consideration, such as for use of the metal-containing material 110 as a filter element, a catalyst, a heat exchange element or a light-weight structural member. Furthermore, this secondary porosity appears to be open porosity, and will therefore tend to enhance permeability of the metal-containing material 110 without compromising structural strength.

As previously mentioned, the significant advantage with the method of the present invention for making the metal-containing material 110 is that little, if any, shrinkage occurs, which significantly contributes to the high porosity and open pore volume achievable in the metal-containing material 110.

According to the process of present invention, shrinkage during each of the vapor phase sintering step 104, shrinkage during the reducing step 108 and overall shrinkage across the entire process is typically smaller than about 15 volume percent. Volume percentage shrinkage occurring during the vapor phase sintering step is determined by finding the difference between the bulk volume of the sintered metal oxide 106 and the bulk volume of the green form 102, dividing the difference by the bulk volume of the green form 102 and converting the result to a percentage. Volume percentage shrinkage occurring during the reducing step 108 is determined by finding the difference between the bulk volume of the metal-containing material 110 and the bulk volume of the sintered metal oxide 106, dividing the difference by the bulk volume of the sintered metal oxide 106 and converting the result to a percentage. Overall shrinkage occurring over the process is determined by finding the difference between the bulk volume of the metal-containing material 110 and the bulk volume of the green form 102, dividing the difference by the bulk volume of the green form 102 and converting the result to a percentage. More typically, shrinkage during the vapor phase sintering step 104, shrinkage during the reducing step 102 and overall shrinkage are each smaller than about 10 volume percent, preferably smaller than about 5 volume percent, and even more preferably smaller than about 2 volume percent.

The small volumetric shrinkage experienced during the process of present invention should not be confused with linear dimension shrinkages reported with prior art sintering and reduction processes. For example, a linear dimension shrinkage of 10 percent relates to a volumetric shrinkage of about 27 percent, assuming that shrinkage is uniform throughout the material.

The extremely small volumetric shrinkage occurring during the process of the present invention permits achievement of very desirable porosity and permeability characteristics in the metal-containing material 110, as previously discussed. Furthermore, these desirable characteristics are achievable without inclusion of organics in the green form 102 and without limiting preparation of the green form 102 to only light compaction. These processing capabilities with the present invention provide significant advantages relative to prior art processes that include the use of organics and/or only lightly compact metal oxide powders for processing. With the method of the present invention a highly porous and permeable metal-containing material 110 is more likely to be produced that has good structural strength, which provides significant advantages in a number of applications.

Although the method of present invention has been described primarily with reference to FIG. 1, which includes the vapor phase sintering step, it should be recognized that in its broadest sense, the invention is not so limited. In that regard, the sintered metal oxide could be preprepared, so that the method of the present invention, in one embodiment, comprises only the reducing step 108, and not the vapor phase sintering step 104, provided that the preprepared sintered metal oxide 106 is a porous vapor phase sintered metal oxide. In most instances, however, it will generally be preferred to perform the method of present invention in a manner to include both the vapor phase sintering step 104 and reducing step 108, in order to maintain a higher level of control to ensure preparation of the metal-containing material 110 with desired characteristics.

In one aspect, the present invention provides the porous metal-containing material produced by chemical reduction to metallic form of at least a portion of a vapor phase sintered metal oxide. The manufacture method described above can be used to make the metal-containing material of the present invention. As noted, the metal-containing material is highly porous and includes an interconnected, open pore volume. The metal-containing material may include any combination of one or more characteristics described above, such as porosity, permeability, pore size, and composition. In one preferred embodiment, the metal-containing material includes the primary porosity and the secondary porosity as described above. In another preferred embodiment, the metal-containing material includes at least one of metallic nickel and metallic iron. In another preferred embodiment, the metal-containing material comprises stainless steel, which includes at least iron, nickel and chromium in appropriate relative quantities. Preparation of such a stainless steel metal-containing material may be accomplished with the method of the present invention through initial inclusion of appropriate relative quantities of oxides of iron, nickel and chromium in the original green form prior to vapor phase sintering. In yet another preferred embodiment, the metal-containing material comprises at least 70 volume percent porosity, which is substantially open porosity, and a mean pore size of smaller than about 10 microns, and more preferably an even smaller mean pore size, with a mean pore size of smaller than about 2 microns being particularly preferred.

In yet another aspect, the present invention provides a variety of products incorporating or made from, at least in part, the metal-containing material and provides various uses for the metal-containing material. Nonlimiting examples of some uses for the metal-containing material within the scope of the present invention include use as or to prepare filter elements, electrochemical cell electrode materials, chemical reaction catalysts or catalyst supports, combustion substrates, heat exchange elements, and light-weight structural members.

Figure 2:
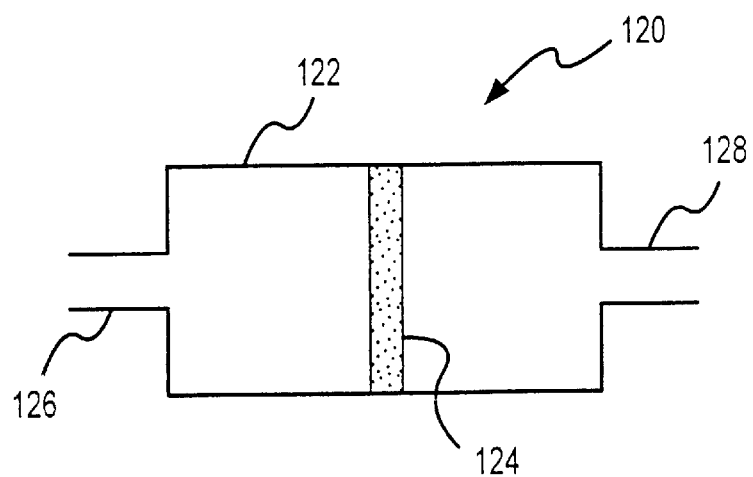
FIG. 2 is a schematic showing a filter of the present invention.

The metal-containing materials of the present invention are well suited for use as filter elements in a variety of applications for filtering gases and liquids. Examples include water purification and air filtration, such as is required to maintain "clean room" conditions for certain semiconductor fabrication and pharmaceutical processing operations. Referring now to FIG. 2, a schematic is shown of a filter 120 including a filter housing 122 and a filter element 124 disposed within the filter housing 122. The filter 120 also includes a fluid inlet 126 and a fluid outlet 128. During operation of the filter 120, fluid to be filtered enters the filter housing 122 through the fluid inlet 126, passes through the filter element 124 and exits the filter housing 122 through the fluid outlet 128. Particulate components contained in the fluid passing through the filter 120 may be retained on the filter element 124, for removal from the fluid. The filter element 124 includes the metal-containing material of the present invention. A preferred metal-containing material for use as the filter element 124 is a composition that is substantially entirely metallic and includes at least one of metallic nickel and metallic iron. In one preferred embodiment, the metal-containing material used as the filter element 124 comprises stainless steel.

The metal-containing material is also well-suited for use as an electrode material in an electrochemical cell, or for use in preparing such an electrode material. Electrochemical cells convert chemical energy into electrical energy by means of electrochemical oxidation-reduction reactions occurring at an anode and a cathode. Electrical charge is transported between the anode and the cathode by means of an electrolyte in contact with each of the anode and the cathode. The anode and the cathode each include at least one electrode material. In one type of electrochemical cell, referred to herein as a battery, at least one of the anode and the cathode includes an active electrode material in which chemical energy is stored for conversion to electrical energy during operation of the cell. The anode and the cathode may each include, in addition to an active electrode material, an inactive electrode material that is present primarily for the purpose of enhancing electrical conductivity and/or structural integrity. In another type of electrochemical cell, referred to herein as a fuel cell, neither the anode nor the cathode includes such an active electrode material. Rather, reactants for the oxidation-reduction reactions occurring in the fuel cell are supplied to the anode and the cathode from external sources during operation of the cell. In fuel cells, the anode and the cathode include substantially only inactive electrode materials, which serve as catalysts for reactions occurring at the anode and the cathode and/or as electrical conductors. Reference is made to Linden, *Handbook of Batteries,* 2d Ed (McGraw-Hill 1995) and to Blomen and Mugerwa, *Fuel Cell Systems,* (Plenum Press 1993) for additional information on various electrochemical cells, the entire contents of each of which are incorporated herein by reference.

Figure 3:
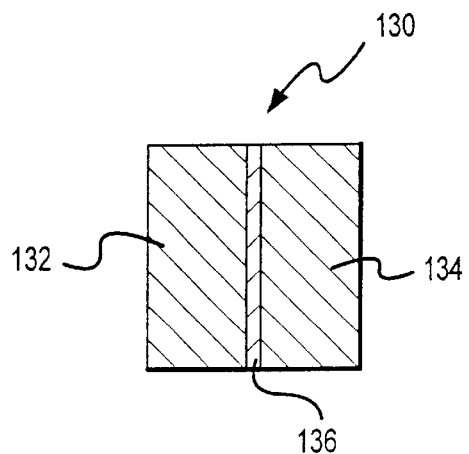
FIG. 3 is a cross-section of an electrochemical cell of the present invention.

Referring now to FIG. 3, one structure is shown for an electrochemical cell 130, which includes an anode 132 and a cathode 134 separated by a separator 136. The electrochemical cell 130 also includes an electrolyte (not shown) contained within each of the anode 132 the cathode 134 and separator 136. The electrochemical cell 130 will typically be contained for use within a housing (not shown) which is frequently sealed. Either one or both of the anode 132 and the cathode 134 may include a porous electrode material that is either the metal-containing material of the present invention or that has been prepared, at least in part, from the metal-containing material of the present invention. Methods for preparing anodes and cathodes for electrochemical cells are well known, and the metal-containing materials may be used instead of currently used materials without significant departure from current practices. For example, nickel and nickel compounds are used as electrode materials in the cathode of a variety of batteries, including nickel-cadmium, nickel-iron, nickel-zinc, nickel-hydrogen, and nickel-metal hydride batteries. These batteries frequently include NiOOH as an active cathode material and also frequently include a porous nickel structure as an inactive electrode material. As one example, a cathode material for one of these cells may be prepared by starting with a porous metallic nickel material of the present invention, which is then impregnated with a concentrated nickel nitrate solution, which in turn is then subsequently converted to NiOOH for the active electrode material. In this example, the porous metallic nickel material of the present invention serves primarily to provide structural integrity to the cathode and to act as an electrical conductor. As another example, iron is used as an anode material in several cell configurations, including nickel-iron cells and iron-air cells. Porous metallic iron material of the present invention may be used to prepare anodes for such cells. In fuel cells, nickel is used as an anode material in alkaline fuel cells and in solid oxide fuel cells, and the metal-containing materials of the present invention may be used to prepare anodes for these fuel cells. In the case of solid oxide fuel cells, the anode typically is a nickel/zirconia composite, with the zirconia often being stabilized with a small amount of yttria. For example, such a composite could be prepared by including both nickel oxide and zirconia in the original green form prior to vapor phase sintering, as previously discussed. If desired, a small amount of yttria could also be included in the green form, with the yttria not being reduced during the reducing step.

The metal-containing materials of the present invention are also well-suited for use directly as a catalyst or as a porous structure for further processing to prepare a catalyst. For example, several chemical processes utilize metallic nickel catalysts, for which the porous metallic nickel material of the present invention could be used. Metallic iron is also used as a catalytic material in many processes and porous metallic iron materials of the present invention could be used in such situations. Sometimes, however, it is desirable to further treat or process the metal-containing material of the present invention to provide the desired composition for a catalyst or to condition the catalyst for use. For example, the metal-containing material could be impregnated with small amounts of catalytic promoters or other catalytic additives. Furthermore, the metal-containing material of the present invention could be used as a porous support material to support a catalytic material deposited on the metal-containing material. For example, the metal-containing material could act as a support for a noble metal catalyst material deposited on surfaces of the metal-containing material. Many different metal-containing catalytic systems are possible, and the metal-containing material of the present invention may be used in any compatible catalyst system now or hereafter known in the art that includes a porous metal-containing structure.

Figure 4:
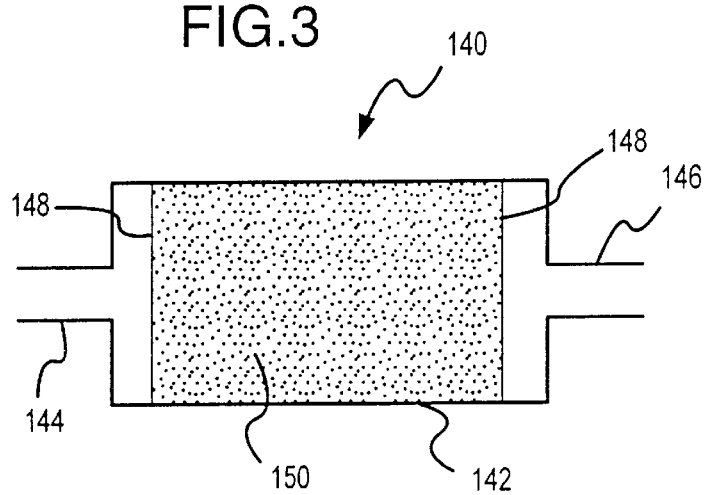
FIG. 4 is a schematic of a chemical reactor of the present invention.

A catalyst including, or prepared from, the metal-containing material present invention may be disposed in any suitable chemical reactor for use in any manner now or hereafter known in the art. Referring now to FIG. 4, a schematic is shown for one structure of a chemical reactor 140 including a reactor vessel 142, a fluid inlet 144 and a fluid outlet 146. Disposed inside the reactor vessel 142 between two porous retention plates 148 is a catalyst 150, with the catalyst 150 comprising either the metal-containing material of the present invention or having been prepared, at least in part, from the metal-containing material of the present invention.

Figure 5:
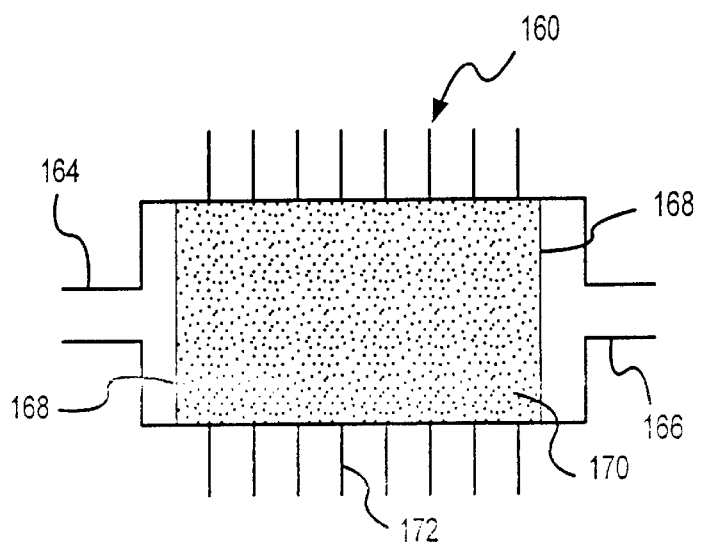
FIG. 5 is a schematic of a heat exchanger of the present invention.

The metal-containing material of the present invention is also well-suited for use as a heat exchange element to provide significant surface area for heat exchange in heat exchangers. Because of the high porosity of the metal-containing material of the present invention, and the substantially open pore volume, the metal-containing materials of the present invention have a very large surface area available for contacting fluids that may be flowing through the pores, significantly facilitating heat transfer to or from the fluid. The metal-containing material of the present invention may be incorporated into a heat exchanger of any compatible design now or hereafter known in the art. Referring now to FIG. 5, a schematic is shown of one structure for a heat exchanger 160. The heat exchanger includes a housing 162, a fluid inlet 164 and a fluid outlet 166. Disposed inside of the housing 162 between two porous retainer plates 168 is a porous heat exchange element 170, which comprises the metal-containing material of present invention. On the outside of the housing 162 are cooling fins 172 to dissipate heat transferred via the heat exchange element 170.

The metal-containing material of the present invention is also well-suited for use as a light-weight structural material. In this application, a metal-containing material would be used substantially entirely as a structural support member for supporting one or more other components of a structure. For example, the metal-containing material could be made in shapes suitable for use as structural members for an airplane wing, and the wing covering and other wing components could be supported by the structural members.

A significant advantage with the present invention, as previously noted, is that the metal-containing material may be manufactured without substantial shrinkage during manufacture. Because of this, the method of the present invention is well-suited for the manufacture of the porous metal-containing material in a variety of shapes with relatively high dimensional precision. Therefore, it may be possible with the metal-containing materials the present invention to avoid costly post manufacture processing that could otherwise be required, because the desired dimensional precision can be obtained with the present invention directly as a result of the manufacturing process. Such control over the shape and dimensions of the metal-containing material will simplify use of the metal-containing material in many of the products and uses previously described.

EXAMPLES

A number of examples are presented to further describe the present invention. Starting materials consist of high purity $Fe_2O_3$ (Alfa Aesar #14680, 99.99% purity) or NiO (Baker #2796-01, 99.9% purity) for each example. The average particle size of these starting powders is measured to be 0.4 and 0.5 $\mu$m respectively. Powders are pressed into pellets with no organic additions. Pressures in the range of 35 to 70 MPa are used for the pressing. Density measurements are made on the pressed pellets using a geometric method. Pressed pellets are stored in a drying oven at 105° C. for a minimum of 24 hours prior to vapor phase sintering.

Figure 6:
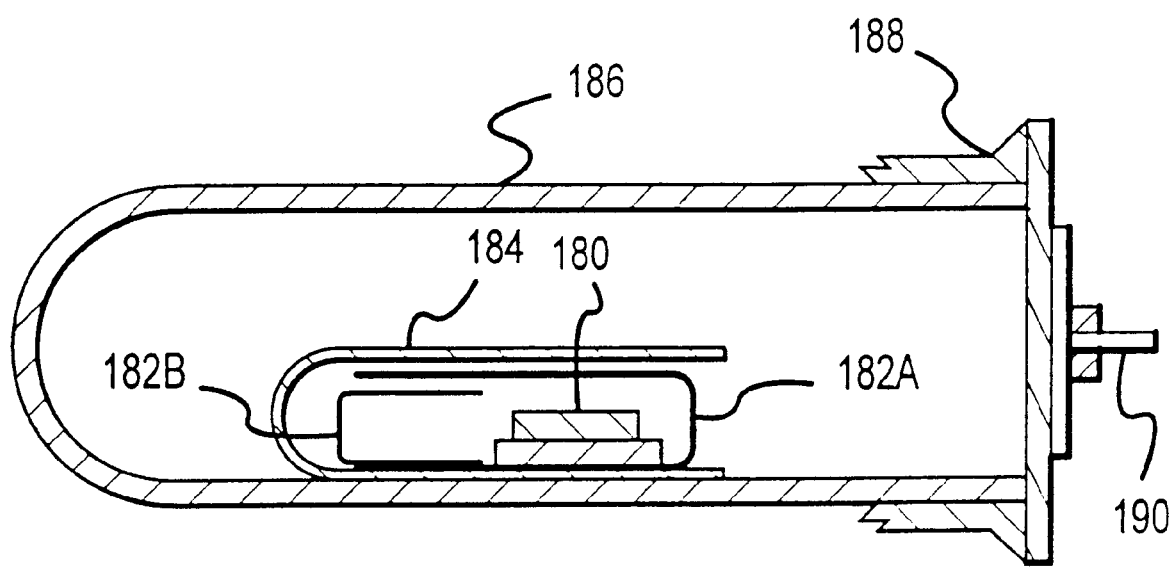
FIG. 6 is a cross-section of an experimental setup used in the examples.

Vapor phase sintering for the examples is performed in a "closed" system (FIG. 6). Pellets 180 are placed in overlapping crucibles 182A,B. The crucibles 182A,B are then placed into a larger inner tube 184. The entire tube assembly is placed within an alumina furnace process tube 186, which is then sealed by vacuum fittings 188. The inside of the alumina tube 186 is flushed several times by pulling a vacuum and purging with argon through a gas port 190. After flushing, a vacuum is then pulled and sufficient HCl gas is introduced into the system such that atmospheric pressure is achieved at the maximum sintering temperature, according to the ideal gas law. Sintering profiles consist of 10° C./min ramp rates to maximum soak temperatures of 1000° C., 1100° C. or 1200° C. for 30 minutes. The result of the vapor phase sintering is a porous sintered metal oxide, which is then reduced to form a porous metal-containing material. Significantly, only slight shrinkage occurs during the vapor phase sintering.

Reduction of the precursor metal oxide is performed with a flowing gas mixture of 10% hydrogen and 90% nitrogen at temperatures between 700 and 1000° C. Time at temperature for the reduction is either four or six hours.

Densification

Table I summarizes results for several different exemplary manufacture conditions. Densities, relative to the pure metal density, for the compressed metal oxide feeds were in the range of 50 to 60%, as were the densities for the precursor metal oxide ($Fe_2O_3$=5.24 g/cc, NiO=6.67 g/cc).

For $Fe_2O_3$, the precursor metal oxide is reduced at 1000° C. for 6 hours. An original sample mass ($Fe_2O_3$) of 0.7341 g (0.5135 g Fe) resulted in a reduced sample mass of 0.5127 g. This indicates complete reduction from iron oxide to iron metal. The sample bulk density after reduction is calculated (geometric) to be 2.3 g/cc. Comparing this to the theoretical density of iron (7.86 g/cc) indicates that the porous iron product has 71 volume percent porosity.

The precursor metal oxide for the NiO vapor phase sintered at 1000° C. for 30 minutes had a geometric density of 3.4 g/cc. After the reduction at 700° C. for 4 hours, the bulk density is determined to be 2.58 g/cc by Archimede's method. This gives a bulk density for the porous nickel product of 29% that of the theoretical value for nickel (8.9 g/cc), or a porosity of 71 volume percent.

TABLE I

| | Densification results | | | | | |
|---|---|---|---|---|---|---|
| Raw Material | Vapor Phase Sintering Temperature (° C.) | Density after Vapor Phase Sintering (g/cc) | (%) | Reduction Temperature (° C.) | Density after Reduction (g/cc) | (%) |
| $Fe_2O_3$ | 1200 | 3.2 | 61 | 1000 | 2.3 | 29 |
| NiO | 1200 | 3.5 | 52 | 700 | 2.43 | 27 |
| NiO | 1200 | 3.7 | 55 | 1000 | 2.91 | 33 |
| NiO | 1000 | 3.4 | 51 | 700 | 2.58 | 29 |
| NiO | None | — | — | 700 | 5.37 | 60 |

The weight loss during the process indicates that all of the NiO had been reduced to nickel metal. When the NiO was vapor phase sintered at 1200° C. for thirty minutes and then reduced at 700° C. for four hours, the porous nickel product had a density of 27% relative to nickel metal, or a porosity of 73 volume percent.

Importantly, the precursor metal oxides prepared by vapor phase sintering did not exhibit any significant shrinkage during the reduction step. The precursor NiO that was reduced at temperatures between 700° C. and 1000° C. exhibited no significant further densification as long as vapor phase sintering was performed prior to the reduction. For comparison, a pellet is pressed from NiO and reduced at 700° C. for 4 hours without any prior vapor phase sintering. The resulting porous nickel pellet has a density of 60%, as shown in Table I, and has experienced significant shrinkage.

Microstructure Analysis

Figure 7:
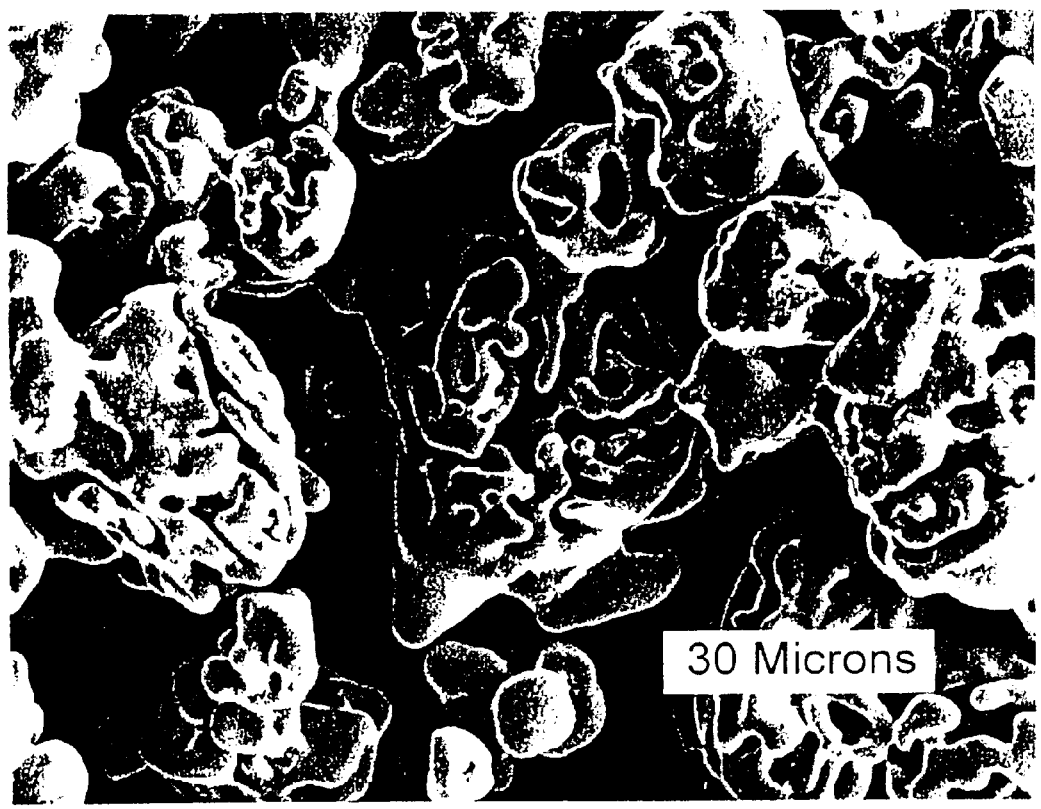
FIG. 7 is a photomicrograph, at a resolution of 1,000×, of a porous metallic iron material of the present invention made by vapor phase sintering an $Fe_2O_3$ compact at 1200° C. for 30 minutes followed by reduction to Fe in 10% hydrogen/ 90% nitrogen at 1000° C. for 6 hours.
Figure 8:
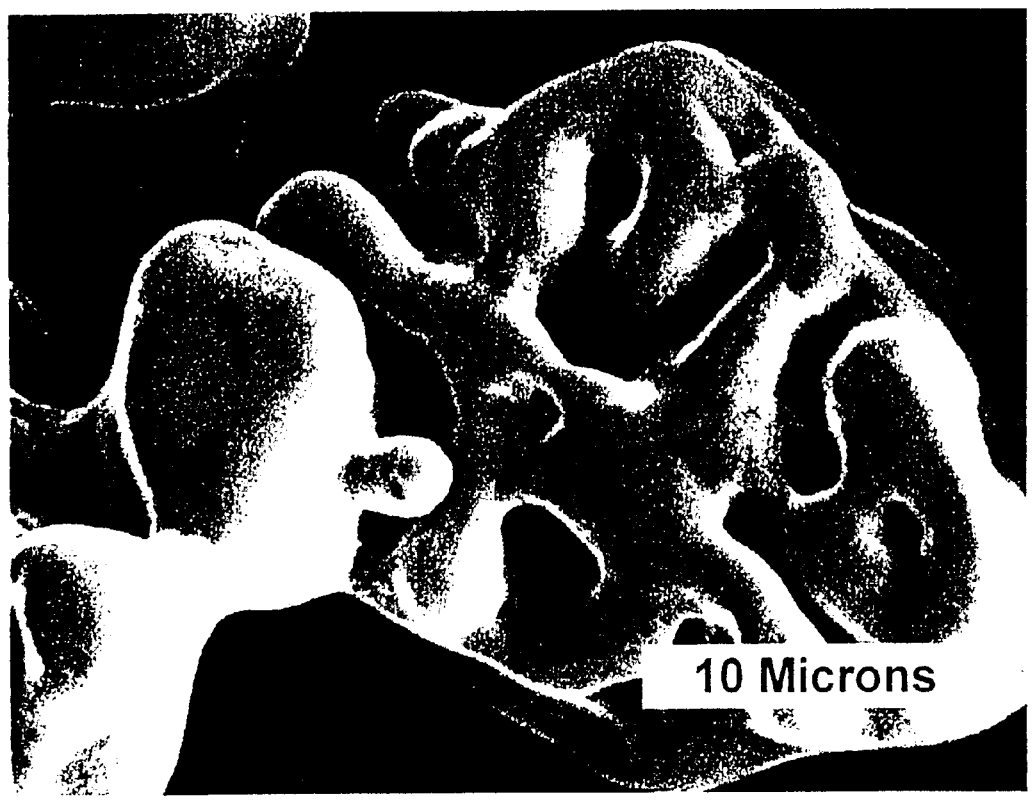
FIG. 8 is a photomicrograph, at a resolution of 4,000×, of a porous metallic iron material of the present invention made by vapor phase sintering an $Fe_2O_3$ compact at 1200° C. for 30 minutes followed by reduction to Fe in 10% hydrogen/ 90% nitrogen at 1000° C. for 6 hours.

Results for the grain size of the original pressed metal oxide compacts, of the precursor metal oxide after the vapor phase sintering, and of the porous metal material after the reduction, are presented in Table II. FIGS. 7 and 8 show the resulting microstructure in a porous iron product made from an $Fe_2O_3$ compact by vapor phase sintering at 1200° C. for 30 minutes followed by reduction at 1000° C. for 6 hours in 10% $H_2$/90% $N_2$. Large grains with sizes in the range of about 10 $\mu$m to about 30 $\mu$m are present. These large grains consist of an intergranular porous network defined by pores in the size range of about 0.5 $\mu$m to about 3 $\mu$m.

Figure 9:
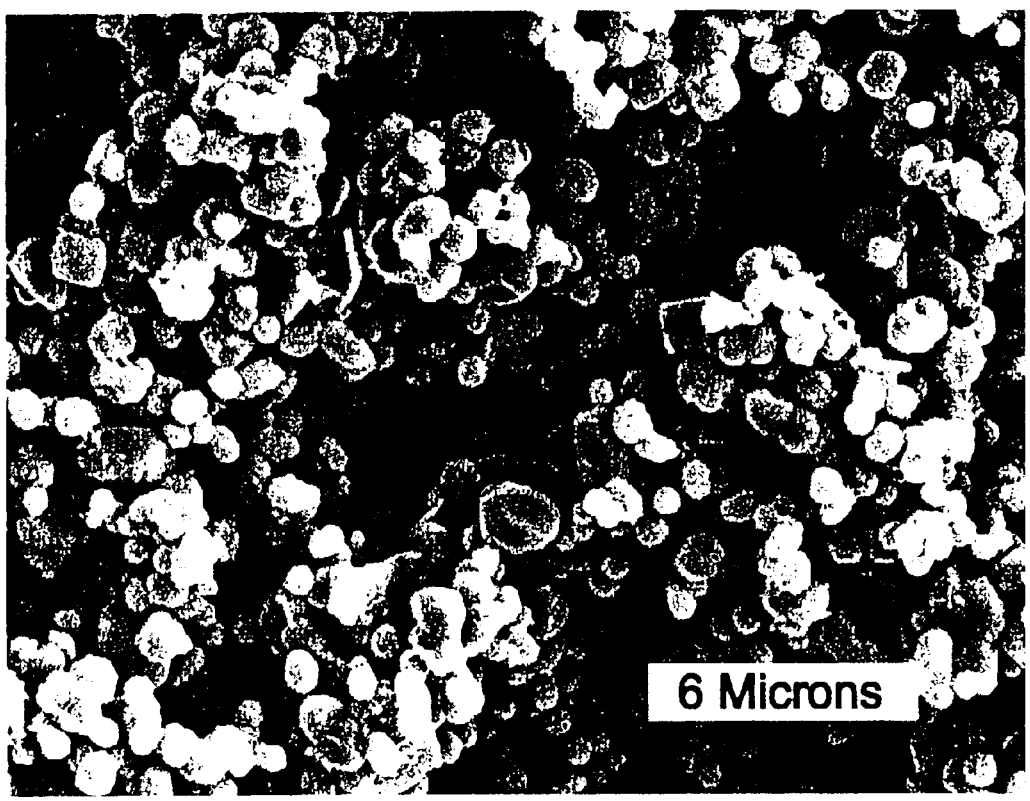
FIG. 9 is a photomicrograph, at a resolution of 5,000×, of a porous sintered NiO prepared by vapor phase sintering a NiO compact at 1000° C. for 30 minutes.
Figure 10:
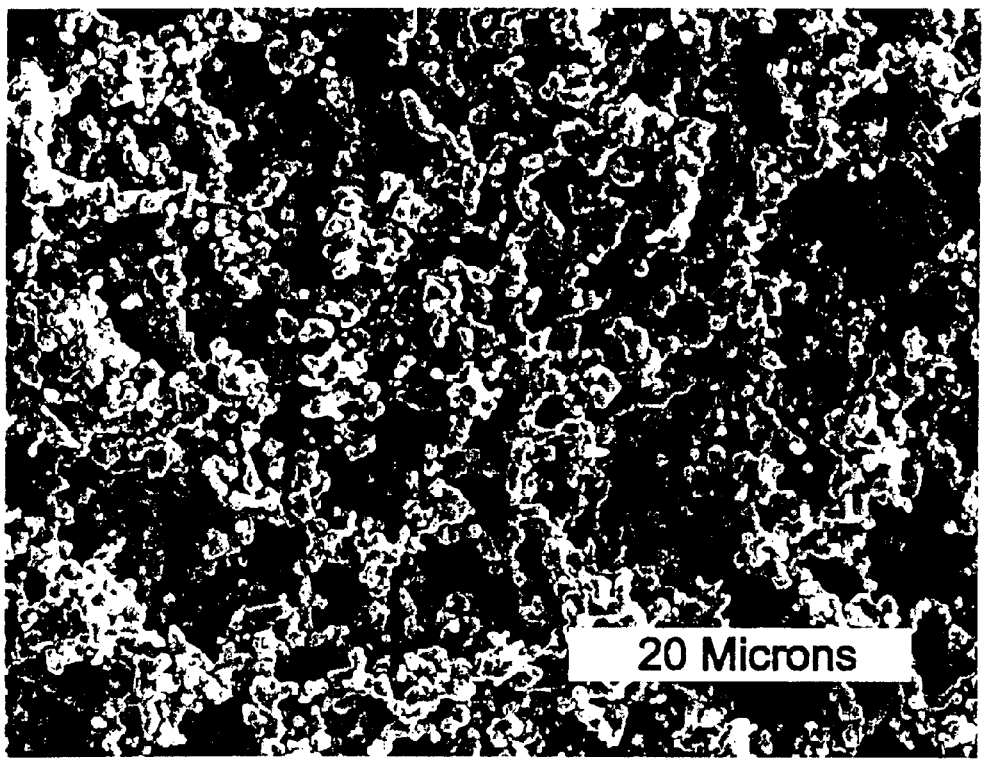
FIG. 10 is a photomicrograph, at a resolution of 2,000×, of a porous metallic nickel material of the present invention made by vapor phase sintering a NiO compact at 1000° C. for 30 minutes followed by reduction to Ni in 10% hydrogen/90% nitrogen at 700° C. for 4 hours.
Figure 11:
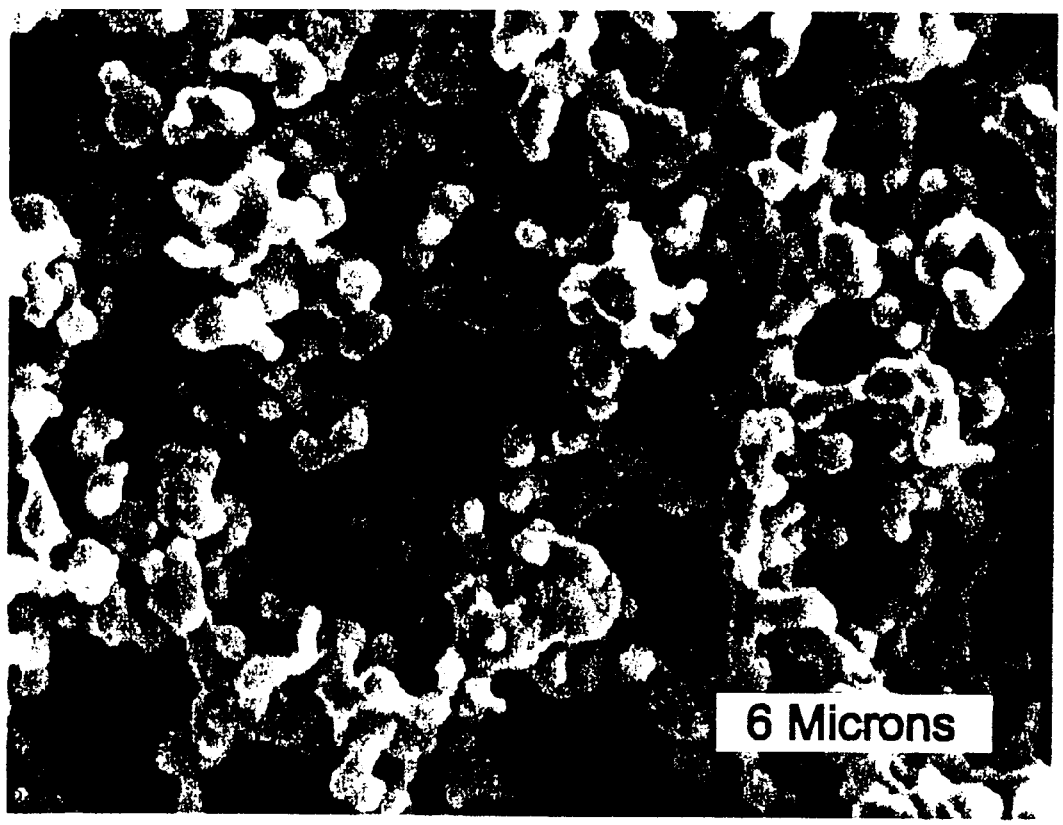
FIG. 11 is a photomicrograph, at a resolution of 5,000×, of a porous metallic nickel material of the present invention made by vapor phase sintering a NiO compact at 1000° C. for 30 minutes followed by reduction to Ni in 10% hydrogen/90% nitrogen at 700° C. for 4 hours.

FIG. 9 shows the microstructure in a precursor NiO formed by vapor phase sintering at 1100° C. for 30 minutes. The grain size is in the range of about 0.5 $\mu$m to about 1 $\mu$m. FIGS. 10 and 11 show the microstructure of a porous nickel product made from a NiO compact by vapor phase sintering at 1000° C. for 30 minutes followed by reduction in 10% $H_2$/90% $N_2$ for 4 hours. The resulting microstructure is a porous network of nickel particles of about 0.5 $\mu$m to about 1 $\mu$m joined by extensive particle necking. No significant grain growth occurred during the reduction process. Porosity within the individual grains is not apparent for these processing conditions.

TABLE II

Grain Growth Results

| Raw Material | Starting Average Particle Size ($\mu$m) | Vapor Phase Sintering Temperature (° C.) | Grain Size after Vapor Phase Sintering ($\mu$m) | Reduction Temperature (° C.) | Grain Size after Reduction ($\mu$m) |
|---|---|---|---|---|---|
| $Fe_2O_3$ | 0.4 | 1200 | 10–30 | 1000 | 10–30 |
| NiO | 0.5 | 1200 | 4–10 | 700 | 4–10 |
| NiO | 0.5 | 1200 | 4–10 | 1000 | 4–10 |
| NiO | 0.5 | 1000 | 0.5–1 | 700 | 0.5–1 |
| NiO | 0.5 | None | — | 700 | 1–3 |

Figure 12:
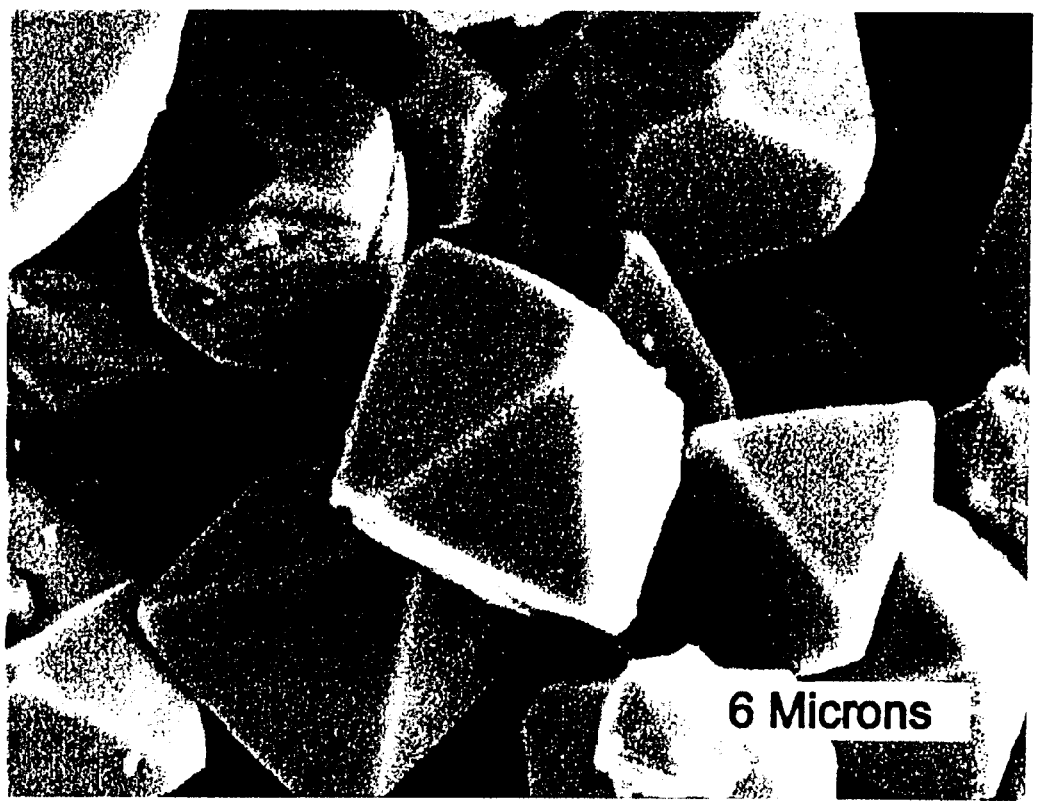
FIG. 12 is a photomicrograph, at a resolution of 5,000×, of a porous sintered NiO prepared by vapor phase sintering a NiO compact at 1200° C. for 30 minutes.
Figure 13:
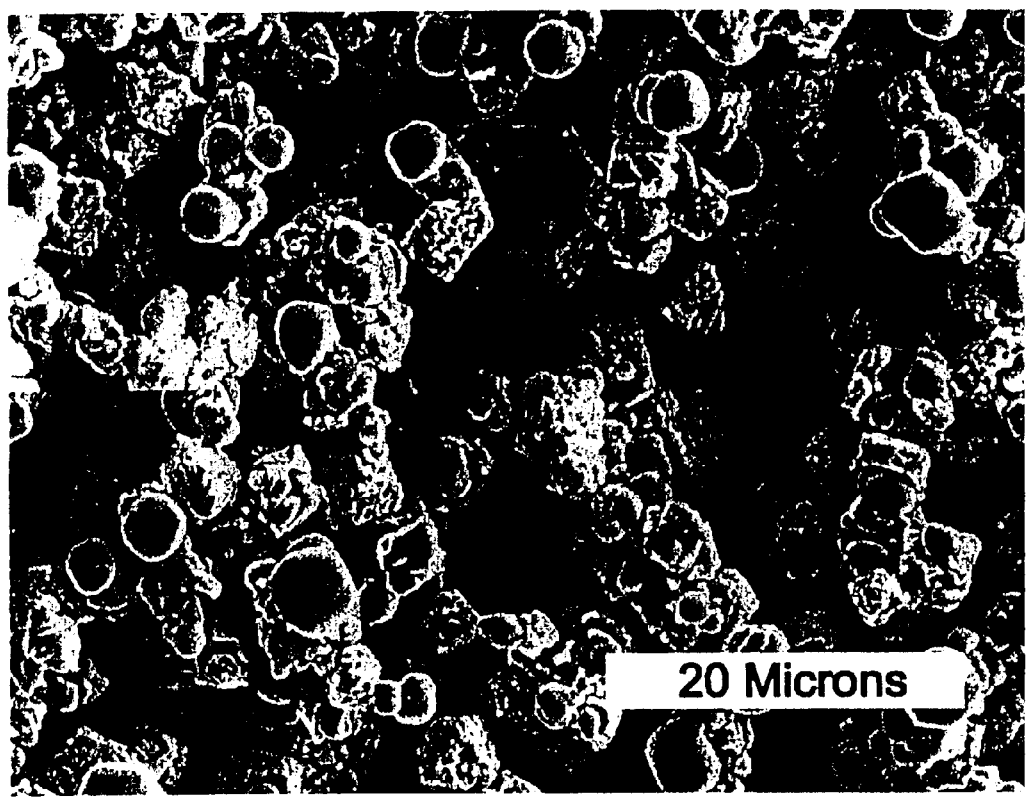
FIG. 13 is a photomicrograph, at a resolution of 2,000×, of a porous metallic nickel material of the present invention made by vapor phase sintering a NiO compact at 1200° C. for 30 minutes followed by reduction to Ni in 10% hydrogen/90% nitrogen at 700° C. for 4 hours.
Figure 14:
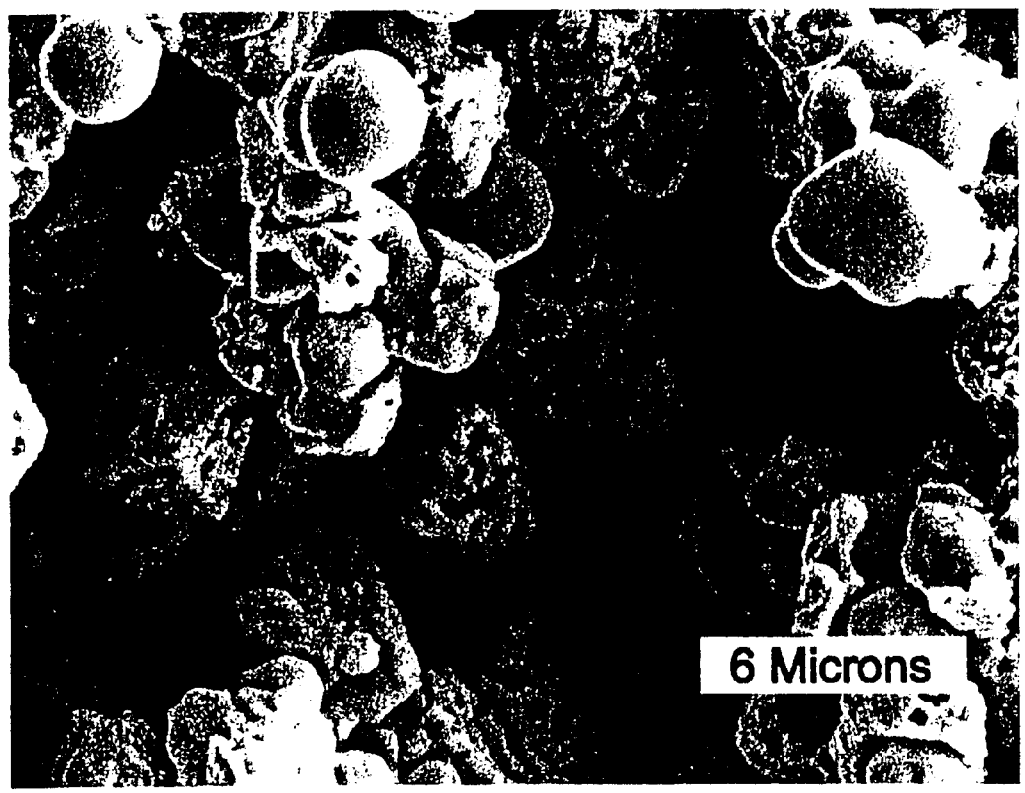
FIG. 14 is a photomicrograph, at a resolution of 5,000×, of a porous metallic nickel material of the present invention made by vapor phase sintering a NiO compact at 1200° C. for 30 minutes followed by reduction to Ni in 10% hydrogen/90% nitrogen at 700° C. for 4 hours.

FIG. 12 shows a microstructure of a precursor NiO made by vapor phase sintering at 1200° C. for 30 minutes. In contrast to sintering at 1000° C., this precursor is defined by large (4 to 10 $\mu$m), well defined "single crystal" grains. The vapor phase sintering temperature did not significantly affect the density, however it does have a dramatic effect on the grain size. FIGS. 13 and 14 show the microstructure of a porous nickel product made from a NiO compact by vapor phase sintering at 1200° C. followed by reduction to nickel metal in 10% $H_2$/90% $N_2$ at 700° C. for 4 hours. The grain size and the porosity network that was present after vapor phase sintering has not changed. As with the iron sample, however, the large grains contain a network of sub-micron pores as a result of the oxide reduction.

Figure 15:
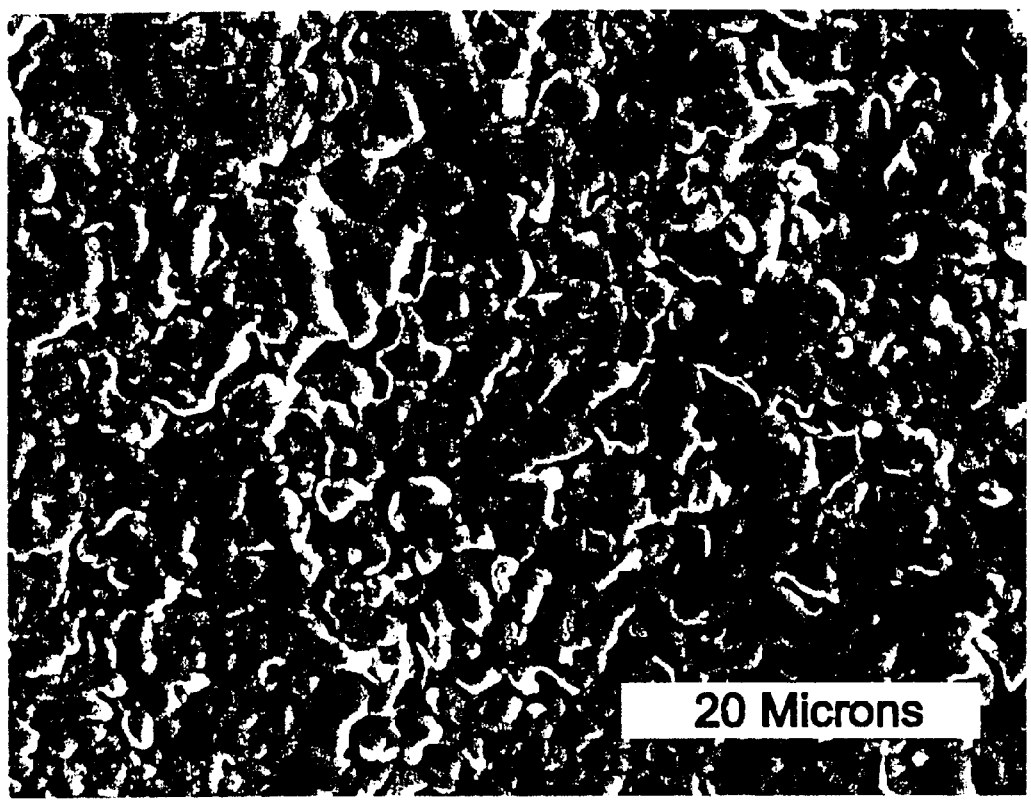
FIG. 15 is a photomicrograph, at a resolution of 2,000×, of a comparison metallic metal material prepared by direct reduction of a NiO compact in 10% hydrogen/90% nitrogen at 700° C. for 4 hours, with no prior vapor phase sintering.

As a comparison to the effects of vapor phase sintering according to the present invention, FIG. 15 shows the surface microstructure of a nickel product made from a NiO compact by direct reduction at 700° C. for 4 hours, and without the benefit of prior vapor phase sintering. Note that most of the open porosity has been closed due to densification.

Permeability

One application for these microporous metals is as filtration media. Permeability testing is performed on porous nickel product samples made according to the present invention (Table III). The samples are in the configuration of 2.54 cm diameter disks. Gas permeabilities are obtained by flowing nitrogen through the disk samples. From Darcy's Law, the independent permeability (k/L), where L is the thickness, was determined to be $1.04 \times 10^{-10}$ m for a sample made by vapor phase sintering at 1000° C. for 30 minutes followed by reduction to nickel metal at 750° C. for 4 hours. Translating this into a flux can be performed simply by dividing (k/L) by the fluid viscosity. For water the resulting flux is calculated to be 47.58 liters/($m^2$ psi min). Bubble point testing for this product sample using n-octanol indicated a maximum pore size of 5.8 $\mu$m and a mean pore size of 1.02 $\mu$m. The porous nickel product made by vapor phase sintering at 1200° C. followed by reduction to nickel metal at 750° C. for 4 hours has a maximum pore size in the range of 20 to 50 $\mu$m. The exact size is difficult to determine using the bubble point method, however, due to the very low pressures corresponding to this size range and the surface tension of n-octanol. The water flux was calculated to be 314 liters/($m^2$ psi min). The grain growth associated with sintering the NiO at 1200° C., therefore, resulted in a much larger pore size, and correspondingly in a much larger water flux.

TABLE III

Permeability results for vapor phase sintered NiO reduced to Porous Ni Product

| Vapor Phase Sintering Temperature (° C.) | Reduction Temperature (° C.) | Independent Permeability (m) | $H_2O$ Flux (Calculated) (l/$m^2$ psi min) | Max Pore Size ($\mu$m) | Mean Pore Size ($\mu$m) |
|---|---|---|---|---|---|
| 1000 | 750 | $1.04 \times 10^{-10}$ | 47.6 | 5.8 | 1.02 |
| 1200 | 750 | $6.83 \times 10^{-10}$ | 314 | 20–50 | — |

While the present invention has been described with reference to various embodiments, it is apparent that further combinations, modifications and adaptations of the various described features of the invention will occur to those skilled in the art. For example, any of the described processing conditions may be used to manufacture the metal-containing material having any composition, and any metal-containing material described may be put to any of the uses described or incorporated into or used in the preparation of any of the products described. It is to be expressly understood that such combinations, modifications and adaptations are within the spirit and scope of the present invention. It is further intended that the claims appended hereto be interpreted to extend to the maximum extent permitted by the prior art.

What is claimed is:

1. A method for making a porous metal-containing material, comprising chemically reducing to metallic form at least a portion of a porous sintered metal oxide, wherein the porous sintered metal oxide is a porous vapor phase sintered metal oxide.

2. The method of claim 1, wherein, during the reducing step, shrinkage is smaller than about 15 volume percent relative to the bulk volume of the sintered metal oxide, as determined by comparison of the bulk volume of the porous metal-containing material to the bulk volume of the porous vapor phase sintered metal oxide.

3. The method of claim 2, wherein the shrinkage is smaller than about 10 volume percent.

4. The method of claim 2, wherein the shrinkage is smaller than about 5 volume percent.

5. The method of claim 2, wherein the shrinkage is smaller than about 2 volume percent.

6. The method of claim 1, wherein the porosity of the metal-containing material is larger than about 40 volume percent.

7. The method of claim 1, wherein the method further comprises, prior to the reducing step, vapor phase sintering a porous green form, comprising at least one metal oxide, to prepare the sintered metal oxide.

8. A method for making a porous metal-containing material having a porosity of at least about 40 percent, the method comprising sintering a porous green form, including at least one metal oxide, to prepare a porous sintered metal oxide and chemically reducing to metallic form at least a portion of the porous sintered metal oxide to prepare the porous metal-containing material, wherein overall shrinkage, determined by comparison of the bulk volume of the porous metal-containing material to the bulk volume of the porous green form, is smaller than about 15 volume percent relative to the bulk volume of the porous form.

9. The method of claim 8, wherein the overall shrinkage is smaller than about 10 volume percent.

10. The method of claim 8, wherein the overall shrinkage is smaller than about 5 volume percent.

11. The method of claim 8, wherein the overall shrinkage is smaller than about 2 volume percent.

12. The method of claim 8, wherein the sintering step comprises vapor phase sintering of the porous form.

13. The method of claim 12, wherein the vapor phase sintering is conducted in an atmosphere including a halide gas.

14. The method of claim 13, wherein the halide gas is selected from the group consisting of a hydrogen halide, an ammonium halide and combinations thereof.

15. The method of claim 12, wherein at least one volatile component, including at least one metal of the at least one metal oxide, is present during at least a portion of the vapor phase sintering, and the vapor phase sintering is conducted at a maximum temperature at which the at least one volatile component exerts a vapor pressure of larger than about $10^{-4}$ atmosphere.

16. The method of claim 12, wherein the vapor phase sintering is conducted in an atmosphere that is substantially free of oxygen gas and hydrogen gas.

17. The method of claim 8, wherein the porous green form is substantially free of organic material.

18. The method of claim 8, wherein the porous green form comprises at least one metal oxide powder.

19. The method of claim 18, wherein the at least one metal oxide powder is pressed into the porous green form.

20. The method of claim 18, wherein the porous green form includes an organic material.

21. The method of claim 18, wherein the at least one metal oxide powder has a weight average particle size of smaller than about 1 micron.

22. The method of claim 1, wherein the porous sintered metal oxide comprises an oxide of at least one of iron, nickel, copper, vanadium, cobalt, zinc, cadmium, tin, tungsten, chromium, niobium and molybdenum.

23. The method of claim 1, wherein, during the reducing step, substantially all of the porous sintered metal oxide is reduced to metallic form.

24. The method of claim 1, wherein the porous sintered metal oxide includes a plurality of different metal oxides.

25. The method of claim 24, wherein a first metal oxide of the plurality of metal oxides is substantially entirely reduced during the reducing step and a second metal oxide of the plurality of metal oxides is substantially not reduced during the reducing step.

26. The method of claim 25, wherein the second metal oxide comprises an oxide of at least one of silica, alumina, titania, magnesia, zirconia ceria and yttria.

27. A porous metal-containing material made according to the method of claim 1.

28. A porous metal-containing material produced by chemical reduction to metallic form of at least a portion of a porous vapor phase sintered metal oxide.

29. The porous metal-containing material of claim 28, further comprising a porosity of larger than about 40 volume percent and a mean pore size of smaller than about 10 microns.

30. The porous metal-containing material of claim 28, wherein the metal-containing material has a porosity of larger than about 50 volume percent.

31. The porous metal-containing material of claim 28, wherein the metal-containing material has a porosity of larger than about 60 volume percent.

32. The porous metal-containing material of claim 28, wherein the metal-containing material has a porosity of larger than about 65 volume percent.

33. The porous metal-containing material of claim 28, wherein the metal-containing material has a porosity of larger than about 70 volume percent.

34. The porous metal-containing material of claim 28, wherein the mean pore size is smaller than about 5 microns.

35. The porous metal-containing material of claim 28, wherein the mean pore size is smaller than about 2 microns.

36. The porous metal-containing material of claim 28, wherein the mean pore size is smaller than about 1 micron.

37. The porous metal-containing material of claim 28, wherein the metal-containing material has an independent permeability of larger than about $1 \times 10^{-10}$ meter.

38. The porous metal-containing material of claim 28, wherein the porous metal-containing material is substantially entirely metallic.

39. The porous metal-containing material of claim 38, wherein the porous metal-containing material includes a plurality of different metals.

40. The porous metal-containing material of claim 28, wherein the porous metal-containing material is a composite material comprising at least a metallic phase and a nonmetallic phase.

41. The porous metal-containing material of claim 40, wherein the nonmetallic phase comprises an oxide of a metal not present in the metallic phase.

42. A product including the metal-containing material of claim 28.

43. The product of claim 42, wherein the product comprises a filter including the porous metal-containing material disposed inside of a filter housing having a fluid inlet and a fluid outlet.

44. The product of claim 42, wherein the product comprises a structure including the porous metal-containing material as a structural member providing structural support to at least one other component of the structure.

45. The product of claim 44, wherein substantially the sole function of the structural member in the product is to provide the structural support.

46. The product of claim 42, wherein the product comprises an electrochemical cell including an anode, a cathode and an electrolyte, at least one of the anode and the cathode including an electrode material comprising the porous metal-containing material.

47. The product of claim 42, wherein the product comprises a heat exchanger including a heat exchange element comprising the porous metal-containing material disposed inside of a housing having a fluid inlet and a fluid outlet, the metal-containing material providing a surface for heat exchange when a fluid is flowing through the housing.

48. The product of claim 42, wherein the product comprises a chemical reactor vessel having a catalyst disposed therein, the catalyst including the porous metal-containing material.

* * * * *

UNITED STATES PATENT AND TRADEMARK OFFICE
CERTIFICATE OF CORRECTION

PATENT NO. : 6,410,160 B1
DATED : June 25, 2002
INVENTOR(S) : Landin et al.

It is certified that error appears in the above-identified patent and that said Letters Patent is hereby corrected as shown below:

Title page,
Item [75], Inventors, after "Steven M. Landin", delete "Colden" and insert
-- Golden --.

Signed and Sealed this

Third Day of September, 2002

Attest:

Attesting Officer

JAMES E. ROGAN
*Director of the United States Patent and Trademark Office*